(No Model.)
C. W. McDORMAN.
HARNESS.
No. 443,106. Patented Dec. 23, 1890.
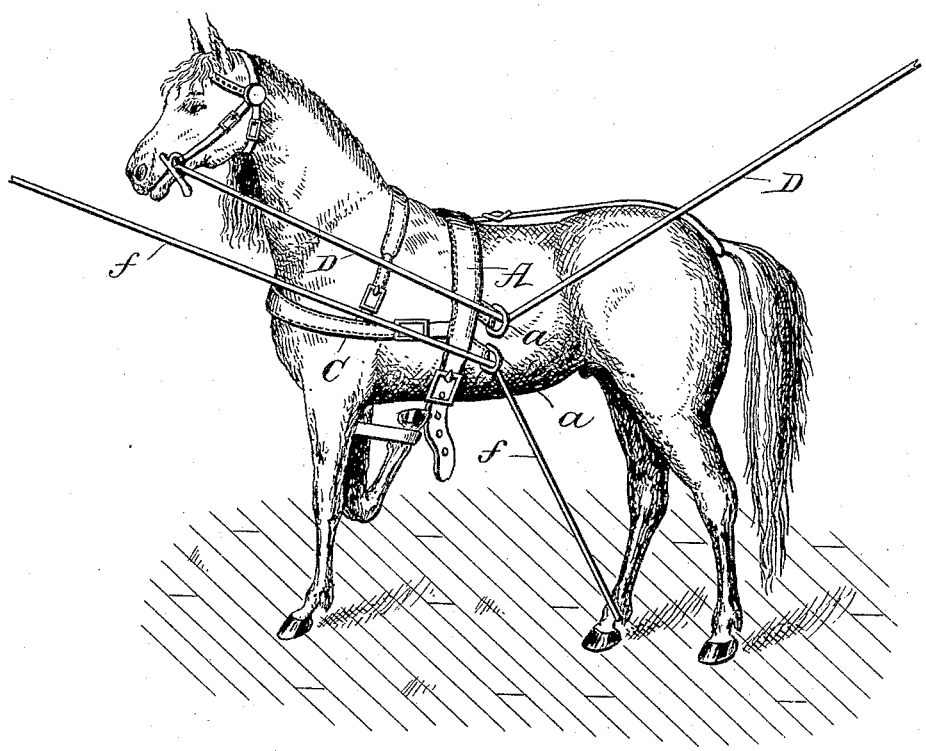
Witnesses:
Wm. C. Shurlock.
M. O. Fleming.
Inventor:
Calvin W. McDorman

UNITED STATES PATENT OFFICE.

CALVIN W. McDORMAN, OF FARGO, NORTH DAKOTA.

HARNESS.

SPECIFICATION forming part of Letters Patent No. 443,106, dated December 23, 1890.

Application filed July 1, 1890. Serial No. 357,433. (No model.)

*To all whom it may concern:*

Be it known that I, CALVIN W. McDORMAN, a citizen of the United States, residing at Fargo, in the county of Cass and State of North Dakota, have invented a new and useful Means for Throwing or Casting Horses, of which the following is a specification.

My invention is an apparatus or harness adapted to instantly and safely throw or cast a horse.

The object of my invention is to supersede the present unwieldy and unsafe apparatus and method of throwing horses by furnishing a harness or apparatus wherewith a horse may be instantly and safely thrown, thereby obviating the possibility of struggling on the part of the animal. I attain this object by the mechanism illustrated in the accompanying drawing, in which a horse is represented with the harness or apparatus in position.

The figure represents the horse with his right front leg flexed at the knee and firmly strapped at the fetlock to the arm. A heavy surcingle A is loosely buckled around the horse. A breast-strap C is passed around the chest of the animal and firmly buckled to either side of the surcingle. It is supported or prevented from falling too low by a strap over the horse's withers. On each side of the surcingle are two short leather attachments, to which are attached at their free ends two heavy D-shaped iron rings $a\ a$. A crupper is also attached to the surcingle, and it is desirable to place a halter and bridle on the horse before operating. A long leather strap is buckled to the ring on the bit, carried backward and passed through the upper D-shaped ring on the left side, and thence over the haunches of the horse to the right side. D D in the figure show this strap in position. The right hind foot of the horse is advanced and a strong leather strap buckled around the fetlock. Thence it is carried up under the horse, passed through the lower D-shaped ring on the left side of the surcingle and forward to the front of the horse. $ff$ show this line or strap in position.

The horse is now harnessed and ready to be thrown. The operator or principal stands behind and to the right of the horse, with the strap D D in hand. The assistant stands in front of and to the left of the horse, with the strap $ff$ in hand. At a signal both men throw their whole force and weight onto their respective lines. The horse's head is suddenly drawn to his left side. His right hind leg is simultaneously drawn up to his abdomen, and, both feet on the right side being off the ground, the horse instantly sinks onto his right rump and rolls onto his right side. He is thus thrown without leaving his tracks and without a struggle. The horse now being down, the assistant releases the strap, and thus relieves the right hind leg, while he (the assistant) steps around to the back of the horse, takes the other strap from the hands of the operator, and firmly holds the horse's head to his left side. The operator now flexes the lower part of the left front leg at the knee and firmly straps it to the arm. This being done, he gently and carefully draws the left hind leg forward, carries the strap attached to the upper left D-shaped ring around the fetlock, draws the leg to the left side, and fastens it there. The operator now steps to the left of the horse, holds the head with the left hand, while he places his right hand under the right knee. The assistant meantime seizes the strap, at first placed around the right hind fetlock, and by a united effort the horse is rolled to his left side. The operator meantime revolves the neck half round, and thus throws the head to the right side. The operator now carefully draws the right hind leg forward, carries the strap attached to the right upper D-shaped ring around the fetlock, draws the leg to the right side, and fastens it there. The horse is now securely bound and prepared for any operation.

What I claim as my invention, and for which I desire to obtain Letters Patent, is—

1. In combination with a harness, the oppositely-extending lines passing through guides on the harness, one of said lines adapted to be secured to the hind leg of the horse on one side and the other adapted to be secured to the head on the opposite side, whereby the leg is raised and head drawn to one side simultaneously, substantially as herein described.

2. In combination with a surcingle having the D-shaped guides, the strap D, adapted to be secured to one side of the horse's head, passing rearwardly through one of said guides and carried diagonally over the horse's rump, and a second strap $f$, adapted to be secured to the horse's foot on the side opposite to which strap D is secured, and thence extending forward diagonally under the body and through the other guide, substantially as herein described.

In testimony whereof I have signed my name to this specification in presence of two subscribing witnesses.

CALVIN W. McDORMAN.

Witnesses:
J. MAC SMITH,
J. B. CRUCIAL.